United States Patent
Martin

(12) 
(10) Patent No.: US 7,160,009 B1
(45) Date of Patent: Jan. 9, 2007

(54) WHEEL RIM ILLUMINATION SYSTEM

(76) Inventor: Franklin D. Martin, 4595 Helen St., Dearborn, MI (US) 48126

( * ) Notice: Subject to any disclaimer, the term of this patent is extended or adjusted under 35 U.S.C. 154(b) by 0 days.

(21) Appl. No.: 11/260,960

(22) Filed: Oct. 27, 2005

(51) Int. Cl.
B60Q 1/00 (2006.01)
(52) U.S. Cl. .......................... 362/500; 362/545; 40/587
(58) Field of Classification Search ................ 362/500, 362/549
See application file for complete search history.

(56) References Cited

U.S. PATENT DOCUMENTS

| 6,168,301 | B1 * | 1/2001 | Martinez et al. ............. 362/500 |
| 6,175,196 | B1 * | 1/2001 | Ragner et al. ........... 315/200 A |
| 6,612,726 | B1 * | 9/2003 | Gloodt et al. ................ 362/500 |
| 6,923,561 | B1 * | 8/2005 | Castro ......................... 362/500 |

* cited by examiner

Primary Examiner—Renee Luebke
Assistant Examiner—Zahra Bennett

(57) ABSTRACT

A wheel rim illumination system is provided which includes a lighting device mechanically mounted to a brake caliper providing backlight illumination of a wheel rim, and a power supply wiring for providing power to the lighting device.

6 Claims, 3 Drawing Sheets

WHEEL RIM ILLUMINATION SYSTEM

FIELD OF THE INVENTION

Figure 1:
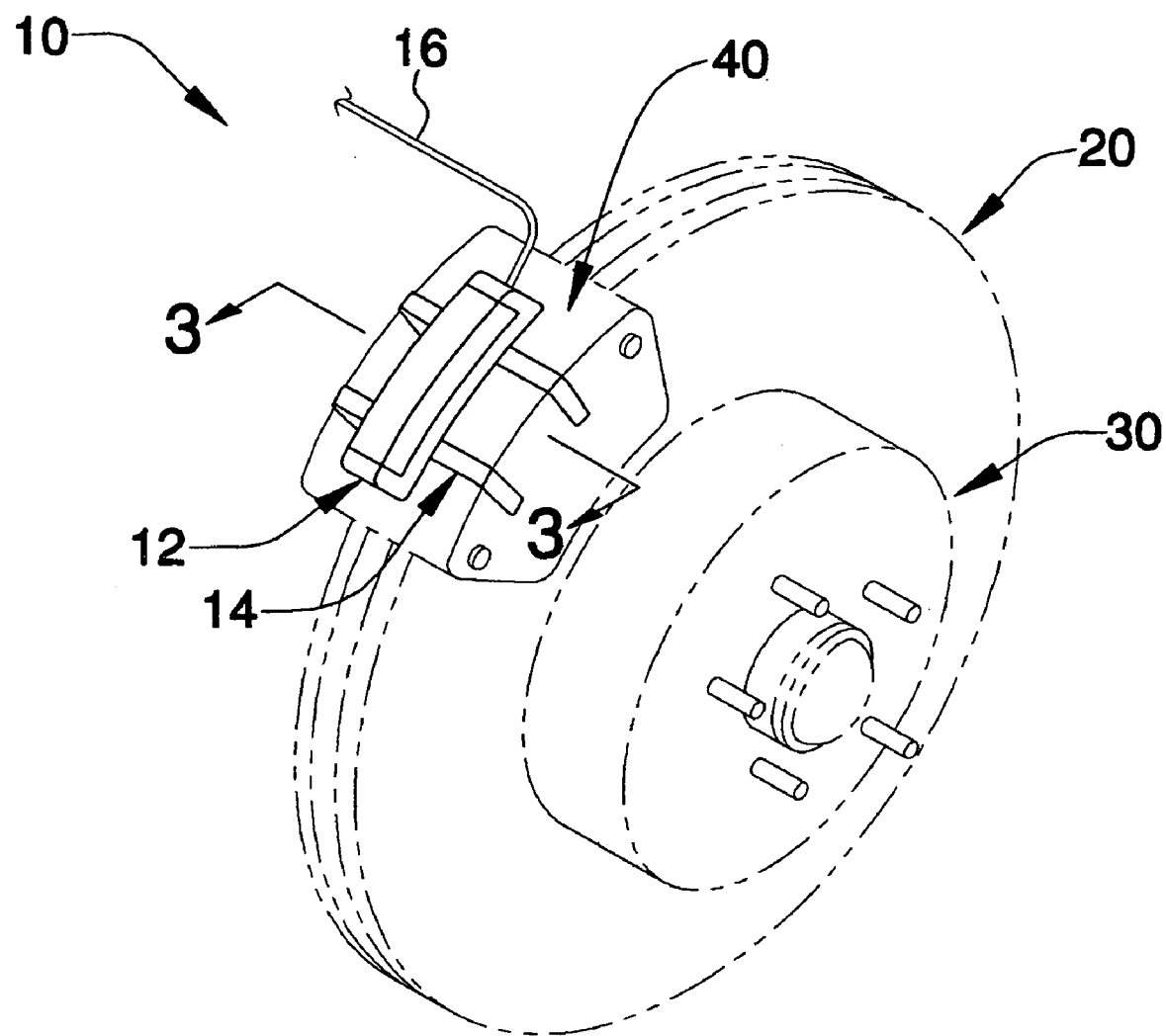

The present invention generally relates to an illumination system for an automobile wheel and more particularly, relates to a wheel rim illumination system that is stationarily mounted on the brake calipers to provide backlighting of the wheel rim or the spokes of the wheel rim.

BACKGROUND OF THE INVENTION

In customized automobiles, intricately designed wheel rims are frequently used to distinguish the vehicle from a normal production automobile. A customized automobile owner, after spending exorbitant amount of money for the expensive wheels, is frequently eager to show off the customized wheel rims mounted on his vehicle. The appealing features of the customized wheel rim can be fully realized when the vehicle is driven in the dark if such wheel rims are illuminated. Previously, others have attempted to produce such illumination by providing a light source on the wheel rim itself and thus rotating with the wheel during vehicle movement. The mechanism of providing electrical power to the lighting device that rotates with the wheel becomes very complicated and expensive. It is therefore desirable to provide a wheel rim illumination system that can be mounted stationarily on an automobile which does not require expensive hardware such as those required when the lighting devices are mounted to and rotating with the wheels.

It is an object of the present invention to provide a wheel rim illumination system that does not have the drawbacks or shortcomings of the conventional wheel illumination systems.

It is another object of the present invention to provide a wheel rim illumination system that can be fabricated at low cost for mounting stationarily to an automobile.

It is still another object of the present invention to provide a wheel rim illumination system that can effectively provide backlighting to the wheel rim when the vehicle is operating in the dark.

It is yet another object of the present invention to provide a wheel rim illumination system that can be fabricated at low cost and mounted in a station manner to the brake calipers on a wheel.

SUMMARY OF THE INVENTION

In accordance with the present invention, a wheel rim illumination system that can be inexpensively fabricated and simply mounted to a brake caliper on a wheel is provided.

In a preferred embodiment, a wheel rim illumination system is provided which includes a brake caliper situated juxtaposed to a brake drum in a an automobile; a lighting device mechanically mounted to the brake caliper providing backlight illumination of the wheel rim; and a power supply wire for providing power to the lighting device.

DETAILED DESCRIPTION OF THE PREFERRED EMBODIMENT

The present invention discloses a wheel rim illumination that can be stationarily mounted to a brake caliper for providing backlight for the wheel rim when the vehicle is driven in the dark.

The wheel rim illumination system provides a set of concealed lights for illuminating custom automobile wheels. The illumination system enables an automobile enthusiast to attractively display expensive wheel rims at night instead of being completely overlooked due to darkness. The illumination system therefore enhances the overall appearance of the automobile or truck and enables motorists to proudly display their expensive rims at night.

The present invention illumination system consists primarily of four lighting devices, four mounting brackets, insulated 12-volt wiring, and a control switch. Each of the four wheels on an automobile can be backlit with lights mounted to the brake calipers in a stationary manner. Each of the lighting device measures approximately 1 inch tall, 2 inches long, and 1½ inches wide. The lighting devices are slightly arched which are weather protected and aimed towards the back of the wheels.

Each of the lighting devices of the present invention illumination system contains a special metal bracket for mounting directly to the brake calipers with two spaced-apart bolts or screws. The mounting prevents any chance of interference with the automobiles braking system. Each of the lighting devices is wired to the vehicles 12 volt DC power supply for operation, and is controlled with an easily accessible switch on the dash board. When a motorist wanted to show off the expensive, customized rims installed on his vehicle, the illumination system can be turned on with the switch. The hidden lighting devices would illuminate through the openings, i.e. or through the spokes, in the expensive wheel rims so they are on full display at the bottom of the vehicles. This creates an impressive, customized display for other motorists, pedestrians, or car show participants to view and enjoy.

The present invention wheel rim illumination system not only adds to the auesthetic appeal of the automobile, but also increases its safety by improving its visibility.

The present invention illumination system provides the appealing features of attractiveness, novelty, and ease of use. Instead of having expensive customized rims going completely unnoticed at night, the rims can be illuminated and proudly displayed. When traveling at night, other motorists would be better able to view the automobile with lighted wheels, thereby reducing the risk of an accident.

Referring initially to FIG. 1, wherein a present invention wheel rim illumination system 10 is shown in a perspective view. Also shown in FIG. 1, in ghost lines, is the wheel drum 20 and the wheel hub 30. As shown in FIG. 1, the present invention wheel rim illumination system 10 is constructed of a lighting device 12 that is mechanically mounted by a mounting bracket 14 to a brake caliper 40 thus providing backlight illumination of the wheel rim (not shown). A power supply wire 16 provides a 12 volt DC power to the lighting device 12.

Figure 2:
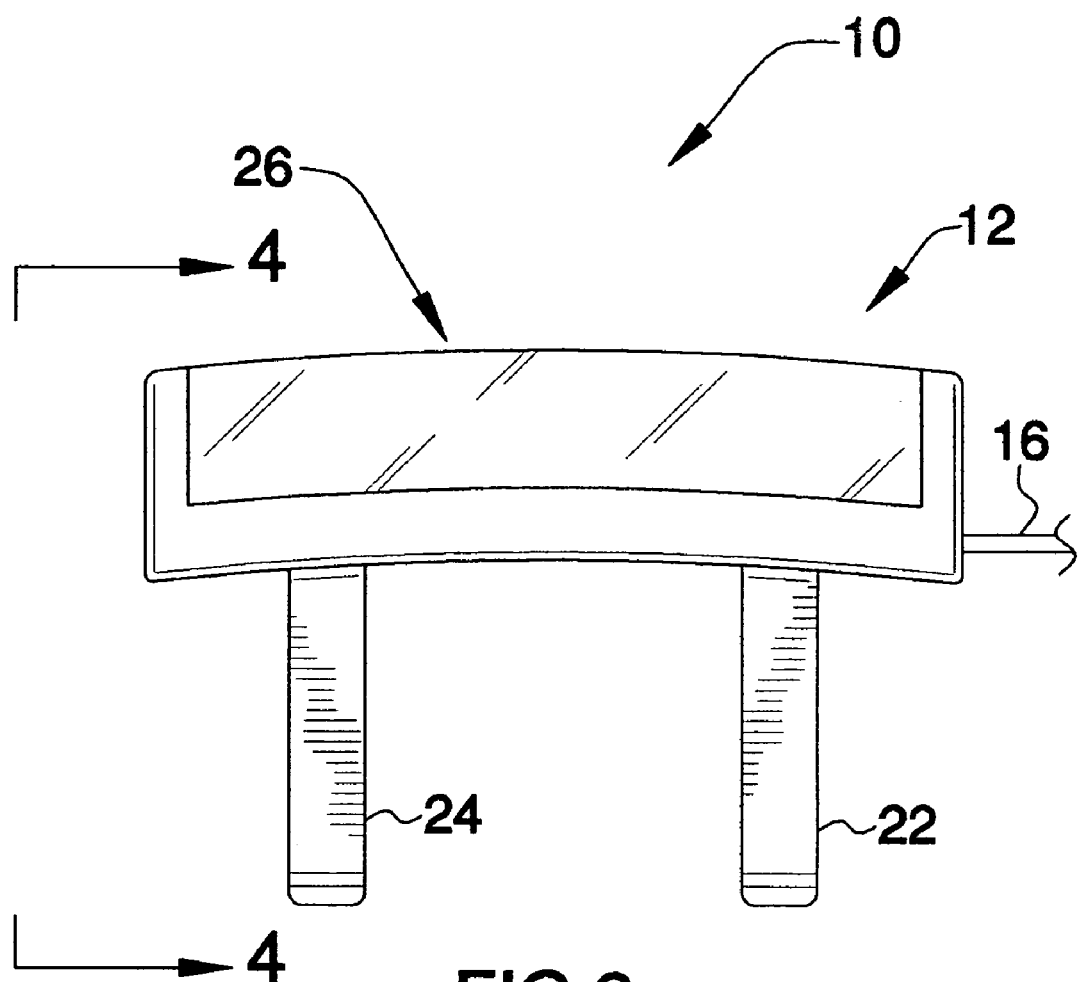
Figure 3:
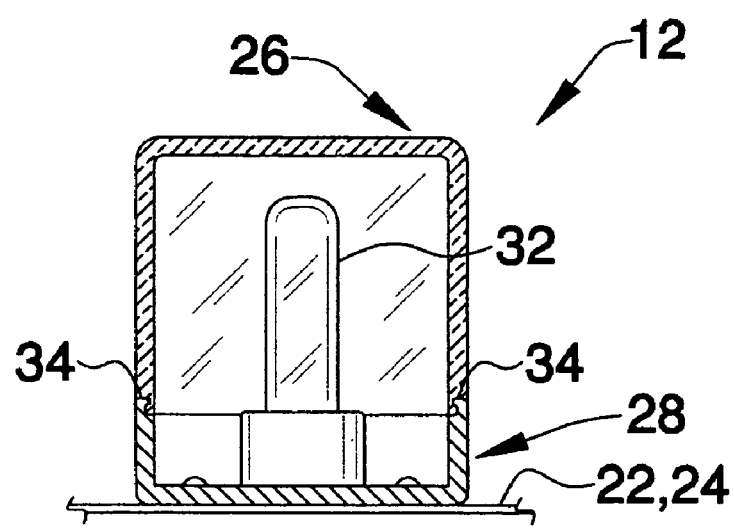
Figure 4:
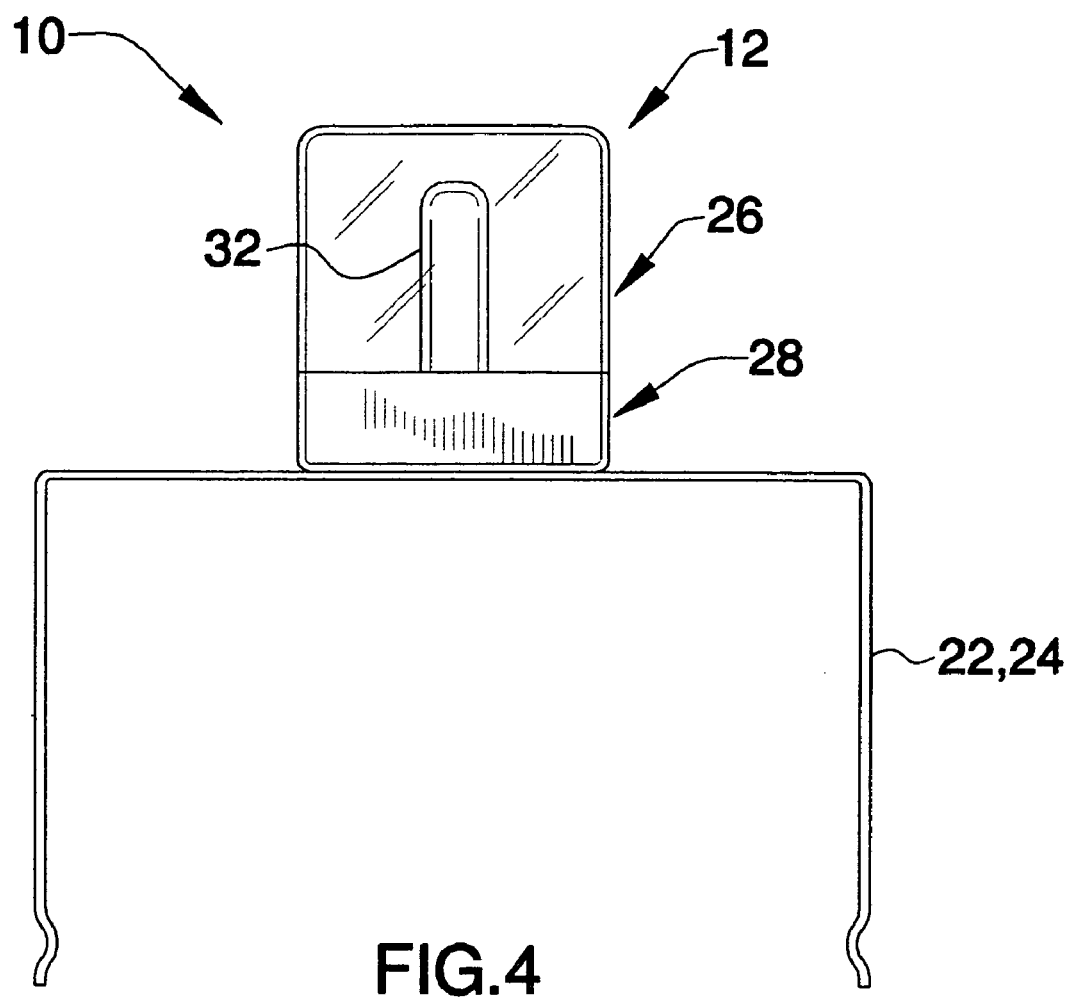

Detailed view of the lighting device 12 are shown in FIGS. 2, 3 and 4. FIG. 2 illustrates a side view of the lighting device 12 with two metal clips 22, 24 extending from one side. The lighting device 12 further includes a substantially transparent lens 26 for allowing light to go through. A light bulb 32 of either the incandescent type, or the light emitting diode type may be used in the lighting device 12. This is shown in FIG. 3. The substantially transparent lens 26 is snapped onto a base 28 that is permanently attached to the clip 22, 24. The snap-on feature of the lens 26 onto the base 28 is made possible by the catch 34 which allows the light bulb 32 to be replaced when burned out.

A cross-sectional view taken along lines 4—4 in FIG. 2 is shown in FIG. 4. The metal clips 22, 24 are designed with an opening that is slightly smaller than the width of a brake caliper such that the clips can grip onto the two sides of the caliper 40 tightly to maintain the position of the lighting device 12. The substantially transparent lens 26 may be provided in either clear, or in a tinted color to further improve the auesthetic effect of the present invention illumination system 10.

While the preferred embodiments of the invention have been described above, it will be recognized and understood that various modifications can be made in the invention and the appended claims are intended to cover all such modifications which may fall within the spirit and scope of the invention.

What is claimed is:

1. A wheel rim illumination system comprising:
    a brake caliper situated juxtaposed to a brake drum in an automobile;
    a lighting device mechanically mounted to and straddled over said brake caliper providing backlight illumination of said wheel rim; and
    a power supply wire for providing power to said lighting device.

2. The wheel rim illumination system according to claim 1, wherein said lighting device further comprising an incandescent light bulb.

3. The wheel rim illumination system according to claim 1, wherein said lighting device further comprising a florescent type light bulb.

4. The wheel rim illumination system according to claim 1, wherein said lighting device further comprising a light emitting diode.

5. The wheel rim illumination system according to claim 1, wherein said lighting device is mechanically mounted to the brake caliper by a pair of clips.

6. The wheel rim illumination system according to claim 1, wherein said power supply wire supplies a 12-volt power to said lighting device.

* * * * *